US011899403B2

(12) United States Patent
Bonnet et al.

(10) Patent No.: US 11,899,403 B2
(45) Date of Patent: Feb. 13, 2024

(54) METHOD FOR CODING AND TRANSMITTING AT LEAST ONE SOLAR TIME

(71) Applicant: ETA SA Manufacture Horlogere Suisse, Grenchen (CH)

(72) Inventors: Thierry Bonnet, Geneva (CH); Jiri Husak, Prague (CZ)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 1262 days.

(21) Appl. No.: 16/454,115

(22) Filed: Jun. 27, 2019

(65) Prior Publication Data

US 2020/0033808 A1 Jan. 30, 2020

(30) Foreign Application Priority Data

Jul. 24, 2018 (EP) .................................... 18185320

(51) Int. Cl.
*G04B 19/26* (2006.01)
*G04G 9/00* (2006.01)
*G04R 20/06* (2013.01)

(52) U.S. Cl.
CPC ........... *G04B 19/26* (2013.01); *G04G 9/0076* (2013.01); *G04R 20/06* (2013.01)

(58) Field of Classification Search
CPC ....... G04B 19/26; G04G 9/0076; G04R 20/06
USPC ............................................................ 368/16
See application file for complete search history.

(56) References Cited

U.S. PATENT DOCUMENTS

| | | | | |
|---|---|---|---|---|
| 5,408,444 | A | 4/1995 | Kita et al. | |
| 2005/0094492 | A1 | 5/2005 | Rosevear | |
| 2006/0074497 | A1 | 4/2006 | Pollin | |
| 2015/0185705 | A1* | 7/2015 | Oshita | G04R 20/04 368/47 |
| 2016/0037134 | A1 | 2/2016 | Medema et al. | |
| 2016/0246264 | A1* | 8/2016 | Nagareda | G04R 20/30 |
| 2016/0358530 | A1 | 12/2016 | Schuch et al. | |
| 2017/0060094 | A1* | 3/2017 | Aihara | G04R 60/14 |

FOREIGN PATENT DOCUMENTS

| | | | |
|---|---|---|---|
| CN | 101206118 | | 6/2008 |
| CN | 103995877 | A | 8/2014 |
| JP | 2000-133106 | A | 5/2000 |

(Continued)

OTHER PUBLICATIONS

European Search Report dated Jan. 29, 2019 in European Application 18185320.1 filed on Jul. 24, 2018 (with English Translation of Categories of Cited Documents).

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A method (P1) for coding a solar time, called the initial solar time (Hs1), associated with a geographical location (Loc) and with a day (J1) of the year, wherein the method includes selecting SEL(Href, Nb1) a reference time (Href) and an initial number of bits (Nb1) as a function of the type of initial solar time (Hs), computing CALC(Nm1) a number of minutes (Nm1) separating the initial solar time (Hs1) and the reference time (Href), coding COD(Hs1) the number of minutes (Nm1) in the initial number of bits (Nb1).

13 Claims, 5 Drawing Sheets

(56) References Cited

FOREIGN PATENT DOCUMENTS

| | | | | | |
|---|---|---|---|---|---|
| JP | 2014-48136 | A | | 3/2014 | |
| JP | 2015-72144 | A | | 4/2015 | |
| JP | 2018-17549 | A | | 2/2018 | |
| WO | WO 2006/117059 | A2 | | 11/2006 | |
| WO | WO 2015/132925 | A1 | | 9/2015 | |
| WO | WO-2016195908 | A1 | * | 12/2016 | ............. G04C 3/001 |

OTHER PUBLICATIONS

Japanese Office Action dated Sep. 23, 2020 in Patent Application No. 2019-127423 (with English translation), 8 pages.
Korean Office Action dated Oct. 7, 2020 in Korean Patent Application No. 10-2019-0087809 (with English translation), 12 pages.
Combined Chinese Office Action and Search Report dated Oct. 29, 2021 in Chinese Patent Application No. 201910660782.4, 8 pages (with English translation of Office Action only).

* cited by examiner

| M | ls | z | cs | Δls | Δz | Δcs |
|---|---|---|---|---|---|---|
| | | | | | | |
| 1 | 07:43 | 12:06 | 16:31 | | | |
| 2 | 07:23 | 12:16 | 17:10 | 00:20 | 00:10 | 00:39 |
| 3 | 06:41 | 12:15 | 17:50 | 00:42 | 00:01 | 00:40 |
| 4 | 05:43 | 12:06 | 18:31 | 00:58 | 00:09 | 00:41 |
| 5 | 04:51 | 11:59 | 19:10 | 00:52 | 00:07 | 00:39 |
| 6 | 04:18 | 12:00 | 19:44 | 00:33 | 00:01 | 00:34 |
| 7 | 04:18 | 12:06 | 19:55 | 00:00 | 00:06 | 00:11 |
| 8 | 04:47 | 12:09 | 19:30 | 00:29 | 00:03 | 00:25 |
| 9 | 05:25 | 12:02 | 18:40 | 00:38 | 00:07 | 00:50 |
| 10 | 06:01 | 11:52 | 17:43 | 00:36 | 00:10 | 00:57 |
| 11 | 06:42 | 11:46 | 16:50 | 00:41 | 00:06 | 00:53 |
| 12 | 07:22 | 11:51 | 16:21 | 00:40 | 00:05 | 00:29 |

Fig. 2

METHOD FOR CODING AND TRANSMITTING AT LEAST ONE SOLAR TIME

CROSS-REFERENCE TO RELATED APPLICATION

This application claims priority to European Patent Application No. 18185320.1 filed on Jul. 24, 2018, the entire disclosure of which is hereby incorporated herein by reference.

FIELD OF THE INVENTION

The invention relates to a method for coding and a method for transmitting at least one solar time, said solar time being a function of a geographical position and a day of the year. 'Solar time' means, for example, the time of sunrise, the time of sunset, or the time of zenith.

BACKGROUND OF THE INVENTION

The length of the day varies throughout the year and depends on the latitude and longitude of a place. This variation is caused by the tilt of the axis of rotation of the earth on itself with respect to the ecliptic plane. It is known that the shortest length of day is the December Solstice in the Northern Hemisphere and the June Solstice in the Southern Hemisphere. At the equinoxes, the length of day and night are equal everywhere on earth. The time of sunrise and sunset consequently vary as a function not only of the day of the year, but also of the precise geographical location of a place.

There are known electronic and/or connected watches capable of indicating the time of sunrise and sunset according to seasonal variations and the geographical position of the wearer of the watch. These watches generally incorporate a positioning system in order to calculate the time of sunrise and sunset using an algorithm which takes account of said positioning data. The positioning system is, for example, a GPS, a triangulation module using the position of base stations of a cellular network (2, 3, 4 or 5G) to which the watch is connected, or a positioning module of an IP router of an Internet network to which the watch is connected.

However, these watches have the drawback of comprising a processor whose computing power is adapted to the complexity of the algorithm used to determine the exact time according to the day of the year and the geographical position of the watch wearer. Moreover, incorporating a positioning system in a watch has a significant impact on the cost and battery life of the watch.

SUMMARY OF THE INVENTION

It is an object of the present invention to overcome the aforementioned drawbacks.

To this end, the invention concerns a method for coding at least one solar time according to claim 1.

The invention thus proposes a method for coding at least one solar time, for example of the sunrise or sunset type, able to be implemented by an electronic device of the smartphone type, wherein the method allows the solar time to be coded in a reduced number of bits. The coded data can then be transmitted to a watch with a low computing power processor, since said watch will not have to compute the solar time itself, but simply decode it. Such a watch will not, therefore, need to incorporate positioning means or a powerful processor.

The invention also relates to a transmission method according to claim 8.

Moreover, the methods may include the features of the dependent claims, taken individually or in any technically possible combinations.

BRIEF DESCRIPTION OF THE DRAWINGS

The invention will be described in more detail below with reference to the annexed drawings, given by way of non-limiting example, in which:

FIG. 2 represents a table showing the times of sunrise, zenith and sunset on the first day of each month for a year, for the city of Ottawa.

DETAILED DESCRIPTION OF THE INVENTION

Elements that are identical in structure or function appearing in the various Figures maintain the same references, unless otherwise specified.

Coding Method P1

The method P1 for coding a solar time, called initial solar time Hs1, is described with reference to FIGS. 1 and 2. Coding method P1 is suitable for implementation by an electronic device of the smartphone type.

Initial solar time Hs1 is associated with a geographical location Loc and a day of the year J1, which is, for example, the current year. In a non-limiting example, geographical location Loc corresponds to the city of Ottawa and day J1 is the 1st of January (referenced 1 in FIG. 2). Initial solar time Hs1 is one of the following types: sunrise (ls), zenith (h) or sunset (cs).

Figure 1:
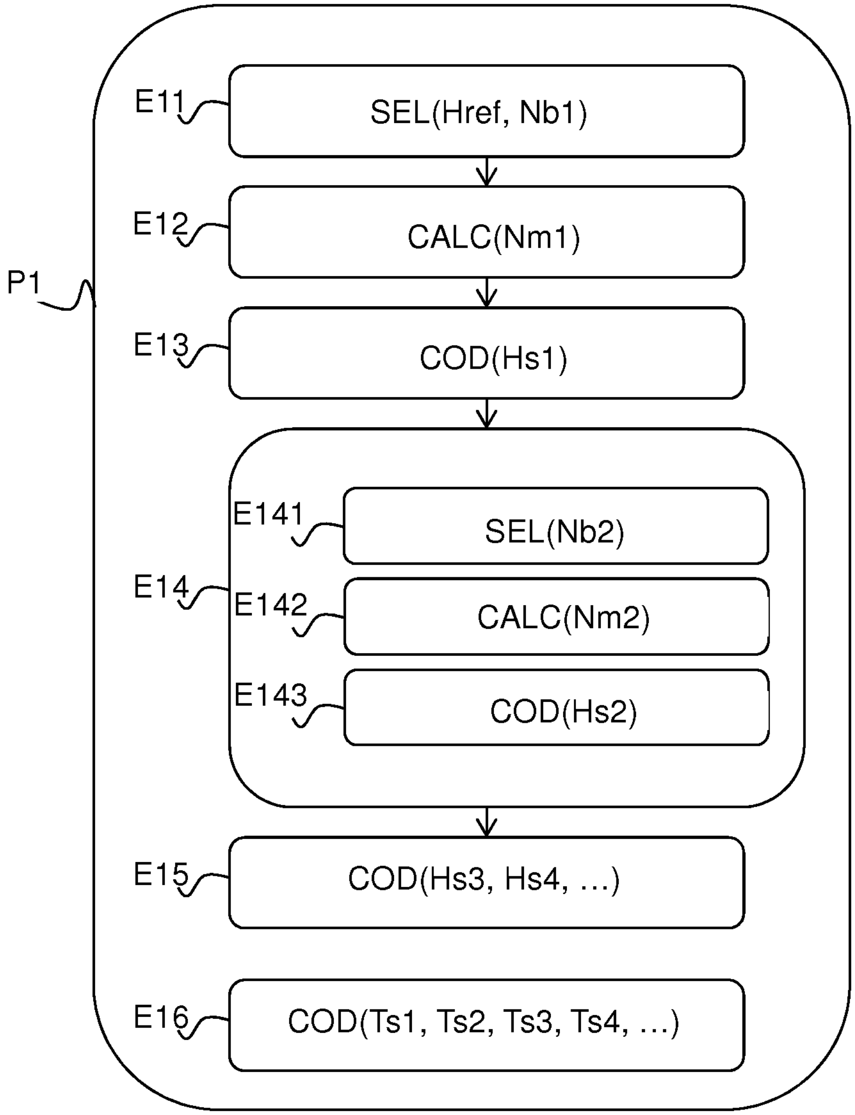
FIG. 1 represents a flow chart showing the steps of a solar time coding method according to a non-limiting embodiment of the invention.

As illustrated in FIG. 1, coding method P1 includes the following steps:

In step E11 referenced SEL(Href, Nb1), a reference time Href and an initial number of bits Nb1 are selected as a function of the type of initial solar time Hs1.

In a non-limiting embodiment, if solar time Hs1 is of the zenith type, the reference time is midday and the initial number of bits Nb1 is 8. In a non-limiting embodiment, if initial solar time Hs1 is of the sunrise type, the reference time is midnight and the initial number of bits Nb1 is 10. In a non-limiting embodiment, if initial solar time Hs1 is of the sunset type, the reference time is midnight and the initial number of bits Nb1 is 10.

In step E12 referenced CALC(Nm1), a number of minutes Nm1 separating said initial solar time Hs1 and reference time Href is computed. The number of minutes Nm1 is equal to the difference between initial solar time Hs1 and reference time Href.

It will be noted that initial time Hs1 is, for example, predetermined by means of a NOAA (National Oceanic and Atmospheric Administration) algorithm, known to those skilled in the art, or obtained from the Internet by the electronic device.

The table of FIG. 2 illustrates the times of sunrise (ls), zenith (z) and sunset (cs) for the city of Ottawa on the 1st day of each of the 12 months (M) of the year 2017.

As seen in the table, if initial solar time Hs1 is of the zenith type, it is 12:06 on 1st January in Ottawa. Initial solar time Hs1 is thus separated by 6 minutes from the reference time, which is midday here. Alternatively, if initial solar time Hs1 is of the sunrise type, it is 07:43 on 1st January in Ottawa. Initial solar time Hs1 is thus separated by 463 minutes from the reference time, which is midnight here.

In step E13 referenced COD(Hs1), the number of minutes Nm1 is coded in the initial number of bits Nb1. Returning to the previous example of Ottawa on the first of January, if initial solar time Hs1 is of the zenith type, the value 6 is coded in Nm1 bits, here 6 bits. Alternatively, if initial solar time Hs1 is of the sunrise type, the value 463 is coded in Nm1 bits, 10 bits here.

It is noted that negative values must also be able to be coded (for example, assuming that the initial solar time is of the zenith type, the reference time is midday, and the zenith time on the day of the year concerned is 11:59: the value −1 must therefore be coded). A negative value can be coded as follows:

the binary bits of its absolute value are inverted (bitwise NOT operation) This operation is also called the ones' complement, and 1 is added to the result.

Thus, to code (−1) in 8 bits:

the value 1 is coded in 8 bits: 00000001, the bits are inverted: 11111110, 1 is added: 11111111.

In a non-limiting embodiment, coding method P1 also includes a step E14 of coding a first additional solar time Hs2 of the same type as initial solar time Hs1, associated with the same location Loc but with a different day J2 of the year.

In a non-limiting embodiment, day J2 corresponds to the same date as day J1, but in the following month. Thus, if day J1 is 1st January of a year, day J2 is 1st February of the same year. Instead of corresponding to the first day of the month, days J1 and J2 could correspond to the 21st day of the month.

Coding step E14 includes a sub-step E141 referenced SEL(Nb2), in which a number of additional bits Nb2 is selected as a function of the type of initial solar time Hs1.

In a non-limiting embodiment, if initial solar time Hs1 is of the sunrise type, the selected number of additional bits Nb2 is equal to 8 bits. Alternatively, if initial solar time Hs1 is of the zenith type, the selected number of additional bits Nb2 is equal to 5 bits. Alternatively, if initial solar time Hs1 is of the sunset type, the selected number of additional bits Nb2 is equal to 8 bits.

Coding step E14 includes a sub-step E142 referenced CALC(Nm2), in which a number of minutes Nm2 separating the first additional solar time Hs2 and initial solar time Hs1 is computed.

In the non-limiting example relating to Ottawa, where initial solar time Hs1 is of the zenith type and is 12:06 on 1st January, the first additional time Hs2 on 1st February is 12:16. The number of minutes Nm2 separating initial solar time Hs1 from first additional time Hs2 is then 10. In the non-limiting example relating to Ottawa, where initial solar time Hs1 is of the sunrise type and is 07:43 on 1st January, the first additional time Hs2 on 1st February is 07:23. The number of minutes Nm2 separating initial solar time Hs1 from first additional time Hs2 is then 20.

Coding step E14 includes a sub-step E143 referenced COD(Hs2) in which said number of minutes Nm2 is coded in the number of additional bits Nb2. Returning to the preceding examples, the value 10 is coded in 5 bits, or the value 20 is coded in 8 bits.

In a non-limiting embodiment, coding method P1 further includes a step E15 referenced COD(Hs3, Hs4, . . . ) of coding a plurality of other additional solar times Hs3, Hs4, . . . The other additional solar times Hs3, Hs4, . . . are such that the plurality of days J1, J2, J3, J4, . . . associated with initial solar times Hs1 and additional solar times Hs2, Hs3, Hs4, . . . correspond to the same day of the month but to different months M1, M2, M3, M4 of the year. Thus, returning to the preceding example, day J3 is 1st March, day J4 is 1st April, etc. Alternatively, instead of corresponding to the first day of the month, days J1, J2, J3, J4, . . . could correspond to the 21st day of the month.

For each other additional solar time Hs3, Hs4, . . . the number of minutes Nm3, Nm4, . . . separating the other additional solar time Hs3, Hs4, . . . from the preceding additional solar time Hs2, Hs3, . . . , i.e. the additional solar time corresponding to the preceding month, is computed and then coded in the number of additional bits Nb2. In the example of Ottawa, where the first additional solar time Hs2 is of the sunset type and is 17:10 on 1st February, and where the third additional solar time Hs3 on 1st March is 17:50: the number of minutes Nm3 separating the third additional solar time Hs3 from the preceding additional solar time (second solar time Hs2) is equal to 40. The value 40 is then coded in 8 bits.

In a first non-limiting variant, step E15 is performed for a series of five additional solar times Hs2 to Hs6 in order to cover the first 6 months of the year. In this case, the numbers of minutes Nm1 to Nm6 relating to only six solar times will be transmitted to a timepiece, and the timepiece will be able to compute solar times Hs7 to Hs12 for the last six months of the year by symmetry from the beginning of the year with respect to the end of the year. The solar times computed for months Hs7 to Hs12 will be imprecise, but the precision achieved may be deemed adequate. Alternatively, the solar times for the last 6 months of the year could be coded and transmitted to the timepiece, and the timepiece could deduce therefrom by symmetry the solar times for the first 6 months of the year. Alternatively, the solar times for the first 7, or respectively the last 7 months of the year could be coded and transmitted to the timepiece, and the timepiece could deduce therefrom by symmetry the solar times for the last 5, or respectively the first 5 months of the year. Naturally, it is noted that the difference between summer time and winter time must be taken into account in the symmetric computation.

In a second non-limiting variant, step E15 is performed for a series of eleven additional solar times Hs2 to Hs12 in order to cover all the months of the year. In this case, all the solar times will be precisely known by the timepiece, but the data to be transmitted will be more voluminous.

Further, in a non-limiting embodiment, in addition to the coding of initial solar time Hs1 and of a series of additional solar times Hs2, Hs3, Hs4, . . . , coding method P1 further includes in step E16 referenced COD(Ts1, Ts2, Ts3, Ts4, . . . ) the coding of a second initial time called initial solar time Ts2, and of a second series of additional times, called second additional solar times Ts2, Ts3, Ts4, . . . Second solar times Ts1, Ts2, Ts3, Ts4, . . . and solar times Hs1, Hs2, Hs3, Hs4, . . . are of a different type but correspond in twos to the same days J1, J2, J3, J4, . . . of the year.

In a first non-limiting variant, second solar times Ts1, Ts2, Ts3, Ts4, . . . are of the sunrise type and solar times Hs1, Hs2, Hs3, Hs4, . . . are of the sunset type.

In a second non-limiting variant, second solar times Ts1, Ts2, Ts3, Ts4, . . . are of the sunrise type and solar times Hs1, Hs2, Hs3, Hs4, . . . are of the zenith type. As will be seen below, this makes it possible to compute by symmetry a series of solar times Gs1, Gs2, Gs3, Gs4, . . . of the sunset type.

In a third non-limiting variant, second solar times Ts1, Ts2, Ts3, are of the sunset type and solar times Hs1, Hs2, Hs3, . . . are of the zenith type. As will be seen below, this makes it possible to compute by symmetry a series of solar times Gs1, Gs2, Gs3, Gs4, . . . of the sunrise type.

Second solar times Ts1, Ts2, Ts3, Ts4, . . . are computed in a similar manner to solar times Hs1, Hs2, Hs3, Hs4,

Transmission Method P2

The method P2 for transmitting a plurality of solar times is described with reference to FIGS. 3 to 5. Transmission method P2 is suitable for implementation partly by an electronic device of the smartphone type and partly by the timepiece.

In a non-limiting embodiment, the timepiece is a non-connected electronic watch with an analogue display.

Figure 3:
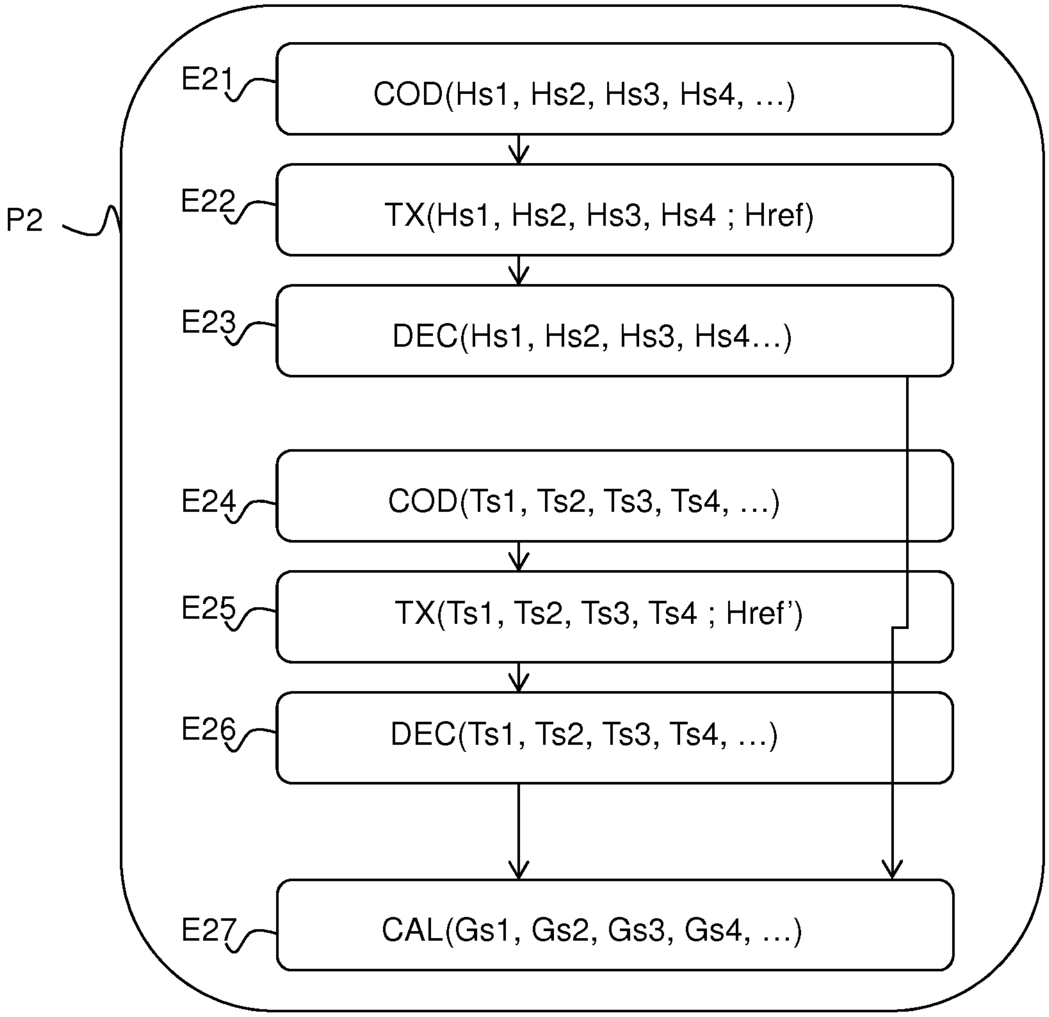
FIG. 3 represents a method for transmitting a plurality of solar times to a timepiece, according to a non-limiting embodiment of the invention.

As illustrated in FIG. 3, transmission method P2 includes the following steps:

In step E21 referenced COD(Hs1, Hs2, Hs3, Hs4,), the electronic device implements coding method P1, in order to code an initial solar time Hs1 and a plurality of additional solar times Hs2, Hs3, Hs4, In step E22 referenced TX(Hs1, Hs2, Hs3, Hs4; Href . . . ), the coded solar times Hs1, Hs2, Hs3, Hs4, . . . are transmitted from the electronic device to the timepiece. The reference time Href used to code the solar times is also transmitted. In a non-limiting embodiment, the transmission is made via an optical communication link, Bluetooth Low Energy or NFC (near-field communication).

In step E23 referenced DEC(Hs1, Hs2, Hs3, Hs4,), the timepiece decodes the coded solar times Hs1, Hs2, Hs3, Hs4, . . . Due to the low number Nb1, Nb2 of bits used for coding, the timepiece only has a low-power processor.

In the preceding example where initial solar time Hs1 is of the zenith type and is 12:06 on 1st January in Ottawa, the timepiece receives the value 6 coded in Nm1=6 bits. The timepiece extracts this value and adds it to the reference time Href received (midday here). The timepiece thus determines that initial solar time Hs1 is 12:06.

Likewise, the timepiece extracts the values coded in Nm2 bits corresponding to additional solar times Hs2, Hs3, Hs4, . . . and adds them respectively to:

- initial solar time Hs1 to determine the first additional solar time Hs2,
- for each subsequent additional solar time Hs3, Hs4, . . . , to the preceding additional solar time Hs2, Hs3, In the example where initial solar time Hs1 is of the zenith type and is 12:06 on 1st January in Ottawa, the timepiece receives and extracts the value 10 coded in 5 bits and adds it to the value 12:06 to determine the first additional solar time Hs2: 12:16.

In the example where the first additional solar time Hs2 is of the sunset type and is 17:10 on 1st February in Ottawa, the timepiece receives and extracts the value 40 coded in 8 bits and adds it to the value 17:10 to determine the third additional time Hs3: 17:50.

Then, after having thus computed solar times Hs1, Hs2, Hs3, Hs4, for days J1, J2, J3, J4, . . . of the year, the timepiece computes the intermediate solar times for all the other days, by linear interpolation.

Figure 4:
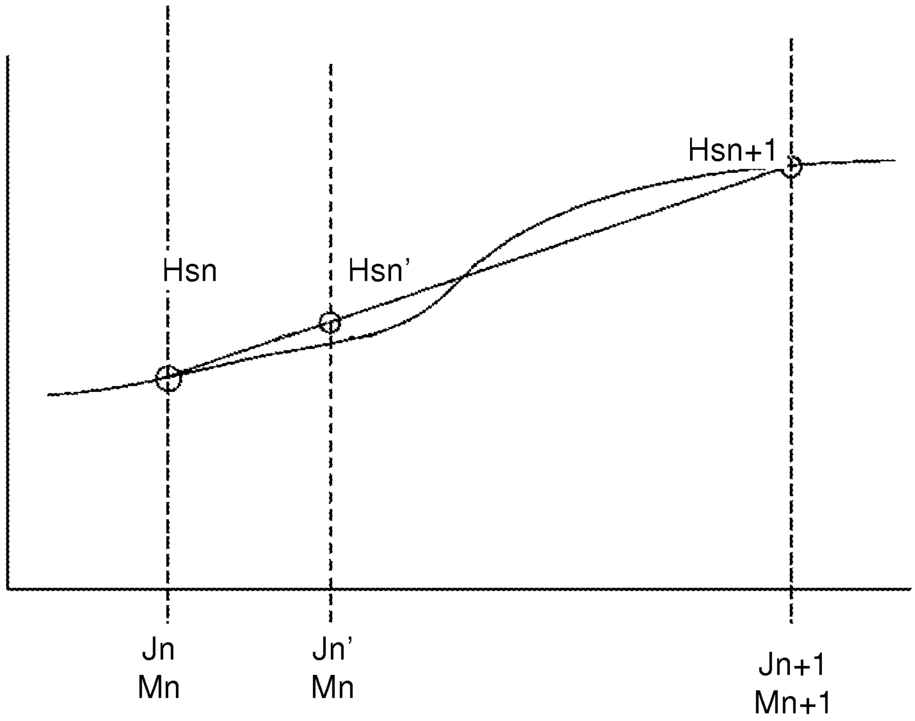
FIG. 4 represents a graph illustrating a linear interpolation for computing an intermediate solar time, according to a non-limiting embodiment of the invention.

Thus, in the graph of FIG. 4, the timepiece has decoded solar time Hsn of the first day of the month Mn (Jn) and decoded solar time Hsn+1 of the first day of the month Mn+1 (Jn+1). Linear interpolation allows the timepiece to compute approximately an intermediate solar time Hsn' for an intermediate day Jn' between day Jn and day Jn+1.

After having thus decoded all the received solar times and computed by linear interpolation the solar times of the intermediate days, the timepiece knows the solar times for each of the days of the year.

In a non-limiting preferred embodiment illustrated in FIG. 3, transmission method P2 further includes three or four additional steps, performed after or in parallel to the three preceding steps.

In step E24 referenced COD(Ts1, Ts2, Ts3, Ts4, . . . ), the electronic device implements coding method P1, in order to code a second initial solar time called second initial solar time Ts1, and a second series of additional solar times, called second additional solar times Ts2, Ts3, Ts4, . . . , second solar times Ts1, Ts2, Ts3, Ts4, . . . and solar times Hs1, Hs2, Hs3, Hs4, being of a different type as explained above.

In step E25 referenced TX(Ts1, Ts2, Ts3, Ts4, . . . ; Href'), the coded second solar times Ts1, Ts2, Ts3, Ts4, . . . are transmitted from the electronic device to the timepiece. The reference time Href' used to code the second solar times is also transmitted. Step E25 is performed in a similar manner to step E22.

In step E26 referenced DEC(Ts1, Ts2, Ts3, Ts4, . . . ), the timepiece decodes coded second solar times Ts1, Ts2, Ts3, Ts4, . . . Step E26 is performed in a similar manner to step E23.

Then, having thus computed second solar times Ts1, Ts2, Ts3, Ts4, . . . for days J1, J2, J3, J4, . . . of the year, the timepiece computes the intermediate second solar times for all the other days, by linear interpolation, as explained above.

Then, in the case where solar times Hs1, Hs2, Hs3, Hs4, . . . are of the zenith type, in step E27, the timepiece computes by symmetry relative to the solar times a series of other solar times Gs1, Gs2, Gs3, Gs4, If second solar times Ts1, Ts2, Ts3, Ts4, . . . are of the sunrise type, the series of solar times Gs1, Gs2, Gs3, Gs4, . . . is of the sunset type. Conversely, if second solar times Ts1, Ts2, Ts3, Ts4, . . . are of the sunset type, the series of solar times Gs1, Gs2, Gs3, Gs4, . . . is of the sunrise type.

Computation by symmetry of solar times Gs1, Gs2, Gs3, Gs4, includes:

- computing in minutes the differences between solar times Hs1, Hs2, Hs3, Hs4, . . . and the respective second solar times Ts1, Ts2, Ts3, Ts4, . . . ,
- computing the series of other solar times Gs1, Gs2, . . . every other solar time GsX being equal to the corresponding solar time HsX plus or minus the corresponding computed number of minutes, according to whether the times of sunrise or sunset are being computed.

Figure 5:
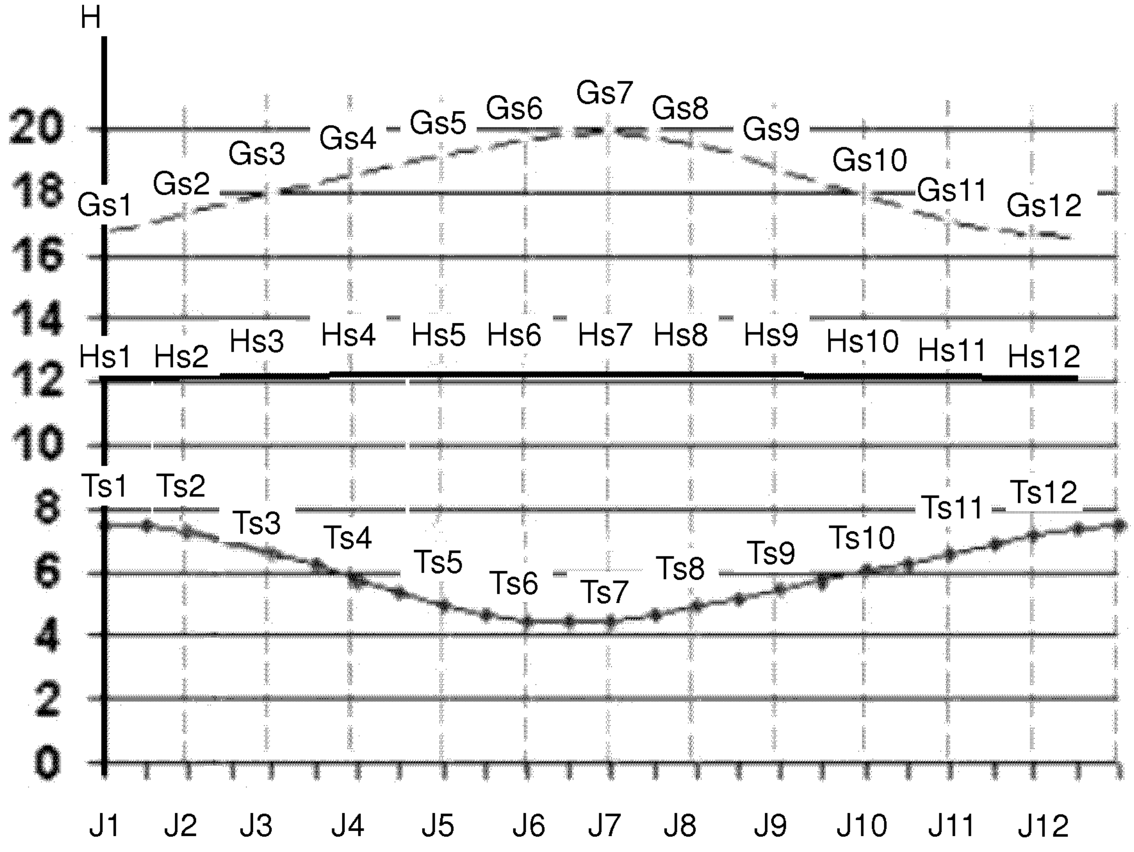
FIG. 5 represents three graphs illustrating the evolution of the time of sunrise, zenith and sunset over one year, for a city taken by way of example.

FIG. 5 shows a graph in which solar times Hs1 to Hs12, second solar times Ts1 to Ts12 and solar times Gs1 to Gs12 are illustrated. Days J1 to J12 are defined on the abscissa, and hours H on the ordinate.

On day J4, Ts4 is substantially equal to 6 o'clock, and Hs4 is substantially equal to 12:01: the difference in minutes between these two times is thus equal to 361 minutes. Gs4 is thus determined by the following computation: 12:01+361 minutes, i.e. 1082 minutes, i.e. 18:03.

Then, after having thus computed solar times Gs1, Gs2, Gs3, Gs4, . . . for days J1, J2, J3, J4, . . . of the year, the timepiece computes the intermediate solar times for all the other days, by linear interpolation.

By means of the transmission method according to the invention, the watch can receive information that allows it to very simply compute the solar times for all the days of a year, and it does not, therefore, need to be connected to the internet or to have a powerful processor.

Of course, this invention is not limited to the illustrated example but is capable of different variants and modifications that will appear to those skilled in the art.

The invention claimed is:

1. A method for coding and displaying a solar time, called the initial solar time, associated with a geographical location and with a day of the year, said method comprising:
- performing by an electronic device,
  - storing a plurality of types of initial solar times, including the following types: zenith, sunset, and sunrise;
  - storing a plurality of different reference times corresponding to each type of initial solar time;
  - storing a plurality of separate initial numbers of bits respectively for each type of initial solar time, wherein the initial number of bits is different between two of the types of initial solar times;
  - selecting one of the types of initial solar times and selecting a reference time and the initial number of bits as a function of the type of initial solar time,
  - computing a number of minutes separating said initial solar time and the reference time,
  - coding said number of minutes in the initial number of bits, and
  - transmitting the coded number of minutes in the initial number of bits from the electronic device to a timepiece via wireless communication,
- performing by the timepiece,
  - decoding by the timepiece of the coded number of minutes and determining the solar time based on the decoded number of minutes and the initial number of bits, and
  - displaying the solar time on a display of the timepiece.

2. The coding method according to claim 1, wherein if the solar time is of the zenith type, the reference time is 12 o'clock and the initial number of bits is 6.

3. The coding method according to claim 1, wherein if the initial solar time is of the sunrise type, the reference time is midnight and the initial number of bits is 10.

4. The coding method according to claim 1, wherein if the initial solar time is of the sunset type, the reference time is midnight and the initial number of bits is 10.

5. The coding method according to claim 1, comprising a step of coding a first additional solar time of the same type as the initial solar time, associated with the same location but with a different day of the year, including:
- selecting a number of additional bits as a function of the type of solar times,
- computing a number of minutes separating the first solar time and the initial solar time,
- coding said number of minutes in the number of additional bits.

6. The coding method according to claim 5, comprising steps of coding a plurality of additional solar times such that the plurality of days associated with the initial and additional solar times correspond to the same day of the month but to different of the year, wherein each coding of an additional time includes a computation of a number of minutes separating it from the preceding additional time and the coding of said number of minutes in a number of additional bits.

7. A method for transmitting a plurality of solar times to the timepiece, said method comprising:
- implementing, via the electronic device, the coding method of claim 6, in order to code the initial solar time and a plurality of additional solar times relative to a reference time,
- transmitting the coded solar times and the reference time from the electronic device to the timepiece,
- decoding by the timepiece of the coded solar times.

8. The transmission method according to claim 7, further comprising:
- coding a second initial solar time, called the second initial solar time, and a second series of additional solar times, called second additional solar times relative to a second reference time, the second solar times and solar times being of a different type,
- transmitting the coded second solar times and the second reference time from the electronic device to the timepiece,
- decoding by the timepiece of the coded second solar times.

9. The transmission method according to claim 8, wherein said second solar times are of the sunrise type and the solar times are of the zenith type, or the second solar times are of the sunset type and the solar times are of the zenith type, wherein the method includes, following the step of decoding the solar times and the step of decoding the second solar times, a computation by symmetry relative to the solar times of a series of other solar times of the sunset type if the second solar times are of the sunrise type, or of the sunrise type if the second solar times are of the sunset type.

10. The transmission method according to claim 7, wherein the months associated with the solar times correspond to the first six months of the year, wherein the method includes, following the step of decoding said solar times, a computation by symmetry of a plurality of additional solar times (Hs7, Hs8, Hs9, Hs10, . . . ) associated with the months corresponding to the other six months of the year.

11. The transmission method according to claim 7, wherein the transmission step, is performed via an optical communication, Bluetooth Low EnergyTM or near-field communication (NFC) link.

12. The transmission method according to claim 7, wherein said electronic device is a smartphone.

13. The coding method according to claim 1, wherein the stored initial number of bits for the zenith type of solar time is a first number of bits, the stored initial number of bits for the sunrise type is a second number of bits, and the stored initial number of bits for the sunset type is the second number of bits.

* * * * *